United States Patent Office 3,232,750
Patented Feb. 1, 1966

3,232,750
METHOD FOR OBTAINING NICKEL AND COBALT FROM ORES NOT CONTAINING SULPHIDE COMPOUNDS OF THESE METALS, AND FROM CONCENTRATES OBTAINED BY THE METHOD
Korneliusz Kazimierz Wesolowski, Warsaw, Michal Wladyslaw Ryczek, Krakow, Stanislaw Tochowicz and Zbigniew Kafra, Katowice, Witold Grabowski and Jerzy Godek, Zabkowice, and Jan Michalski and Ryszard Topolnicki, Warsaw, Poland, assignors to Politechnika Warszawska, Warsaw, Poland, a technical university, and Zaklady Gorniczo-Hutnicze "Szklary," a Polish enterprise
No Drawing. Filed July 20, 1962, Ser. No. 211,410
Claims priority, application Poland, June 9, 1962, 99,026
8 Claims. (Cl. 75—119)

A method for obtaining nickel and cobalt from ores not containing sulphide compounds of these metals, and from concentrates obtained by the method according to our copending application Serial No. 211,409.

Our copending application Serial No. 211,409 relates to methods for obtaining nickel and cobalt in form of specific or complex concentrates from poor silicate ores as well as from metallurgical offals and describes the process as being adaptable to a starting material which has a nickel content as low as about 0.15% Ni.

Object of the invention is to obtain nickel and cobalt from all types of ores in which the nickel and the cobalt occur in form of oxides, hydroxides and other non-sulphide compounds of various systems of metallic elements such as: Cr—Ni—Co, Cr—Mn—Ni—Co, Cr—Ni—Co—Fe, Fe—Ni—Co—Cr and others such as e.g. complex laterite ore with free iron hydroxide or chromium-nickel-iron-ore, and from concentrates obtained by the method according to our copending application Serial No. 211,409.

The method consists in conveniently preparing the kiln charge consisting of any kind of oxide ores or hydroxide ores, as stated above, and of additions containing sulphur, sulphides, sulphates or sulphides of other metals as well as chlorides stated in our copending application Serial No 211,409, subjecting it to roasting and to multiple lixiviation of the roasted material also by the method according to our copending application Serial No. 211,409.

The lixiviation of the roasted material by means of water, weak acids or an aqueous ammonia solution causes nearly all the nickel, cobalt, chromium, manganese and a certain inconsiderable part of iron contained therein to dissolve. The solution containing the dissolved salts is then separated from the not yet dissolved iron oxide and from insoluble silicates.

In the separated solution there are in form of salts: nickel, cobalt, chromium, manganese, magnesium, sodium and unimportant quantities of iron.

Insoluble parts with a higher iron content are utilized for direct processing in iron and steel metallurgy and those with a lower iron content are subjected to an enrichment by known methods and are also utilized in the iron metallurgy.

The recovery of nickel and cobalt from the solution consists in that at first the nickel and the cobalt are precipitated therefrom by means of an excess of alkali metal hypochlorite with a pH-value of 4–4.5. In these conditions the manganese oxidizes to its heptavalent state, and the chromium—to its hexavalent state, as a result of which they remain in solution as alkali metal permanganate and chromate. Together with manganese and with chromium, the magnesium salts remain in the solution. When increasing the pH-value to 5–5.5 and adding a minimal quantity of a reducing agent such as gaseous $SO_2$, a solution of $FeSO_4$ or a metallic powder of Zn or Fe, $MnO_2$ is precipitated from the solution and is then separated by filtration. By adding thereupon ammonia water or limewater with a pH-value not exceeding 6, chromium is then precipitated as $Cr[OH]_3$. Magnesium however precipitates from the solution only with a pH-value exceeding 7. Mirabilite is recovered from the solution by known methods.

The previously obtained common sediment of nickel and cobalt by precipitating by means of alkali metal hypochlorites, is processed by several methods to separate cobalt from nickel. The first of said methods consists in the selective thermal decomposition of nickel and cobalt sulphates and of the iron, chromium, manganese and magnesium residues and in the subsequent lixiviation by means of water or slightly acidified water. To this purpose, the obtained nickel and cobalt concentrate which is contaminated with still other metals, is first mixed with concentrated sulphuric acid and the obtained product in form of sulphates is roasted at a temperature of about 700° C. After such an operation, only the nickel and cobalt sulphates remain in a form which is soluble in water or in slightly acidified water. The other sulphates are decomposed since the increased temperature is above their decomposition temperature. From the nickel and cobalt sulphate solution, upon separation of the sediment composed of $Fe_2O_3$, $Cr_2O_3$, $Mn_3O_4$, MgO and other oxides, at first cobalt with a pH-value of 5.5 is precipitated by means of alkali metal hypochlorites or alkaline earth hypochlorites (without using an excess of the same) in form of a slurry of cobalt hydroxide $Co[OH]_3$. Upon separation of cobalt hydroxide, from the solution is precipitated the nickel in form of an insoluble nickel hydroxide $Ni[OH]_2$ with a pH-value of more than 6. The sediments of nickel and cobalt hydroxides thereby obtained are separately processed according to known methods to cobalt, nickel or to an alloy of both these metals by electrolysis, fire-process etc.

The second method consists in the entire reduction in the solid phase of the nickel and cobalt compounds and with partial reduction of iron compounds, but without the reduction of compounds of other contaminations such as Cr, Mn, Mg and others, by means of a gaseous reducing agent such as Co, $H_2$, water gas and others.

As a result of the reduction, nickel and cobalt pass entirely into the metallic state in form of powder, while iron passes mainly into $Fe_3O_4$ or eventually into FeO. From the reduced concentrate containing nickel and cobalt in a metallic state in form of powder, by the action of CO at non-increased pressure and in a temperature of up to 100° C. one obtains volatile nickel tetracarbonyl, $Ni[CO]_4$, while cobalt continues to remain in the metallic state. The nickel tetracarbonyl is purified at first by fractional distillation and then it is decomposed to nickel and free carbon oxide according to known methods. Cobalt is recovered from the residues (together with nickel residue) by subjecting it to the action of gaseous carbon oxide with increased pressure up to 10 atm and with heating to a temperature of 100° C. In these conditions the nickel residue pass into the form of a volatile nickel tetracarbonyl which will be processed by known methods, while cobalt in form of a nonvolatile cobalt carbonyl as well as iron oxides with other oxide impurities remain in the starting mass without any change. The recovery of cobalt carbonyl takes place by extraction by means of organic solvents e.g. benzene, whereupon the extract is separated by evaporation of the solvent and is processed to oxide and subsequently to metal by known methods.

A further method consists in the separation of nickel and cobalt from the dried but not roasted common concentrate by dissolving the nickel and cobalt hydroxides in ammonia water, whereas nickel and cobalt pass into the solution as $Ni[NH_3]_6[OH]_2$ and $Co[NH_3]_6[OH]_2$, subsequently in the separation of the solution from the insoluble residue containing other impurities, and in the addition, up to saturation, of sodium chloride, whereas nickel precipitates as $Ni[NH_3]_6Cl_2$, while cobalt remains in the solution as $Co[NH_3]_6[OH]_2$. The precipitated complex nickel compounds are separated from the solution by filtration, and the cobalt is separated by distilling off the solvent. The nickel and cobalt compounds thereby obtained processed to oxides by roasting and subsequently they are worked up to metal or their alloys.

A modification of the above stated method consists in dissolving the nickel and cobalt hydroxides by means of an ammonium sulphate solution with a small addition of ammonia at a temperature of 5–50° C. and in separating from insoluble residues containing iron, magnesium and other impurities by filtration. The nickel compound contained in the solution is reduced to a nickel powder by means of gaseous hydrogen in a closed reactor and is then separated from the solution by filtration. Subsequently sulphur or ammonium sulphide is introduced into the solution containing a cobalt compound and upon heating it to a temperature of about 50° C. gaseous hydrogen is passed therethrough also in a closed reactor in consequence of which a sediment of cobalt sulphide (CoS) is obtained. The sediment of cobalt sulphide thereby obtained is separated from the solution by filtration and is then further worked up to the desired cobalt form by known methods.

A still further modification is a method which consists in separating nickel and cobalt from the undried common concentrate, but entirely washed out of sodium sulphates, magnesium sulphate and other sulphates, by oxidizing the cobalt to trivalent cobalt hydroxide by means of a small quantity of hypochlorite and then adding ammonia water. In these conditions the cobalt hydroxide together with other impurities remains insoluble in the sediment, while nickel hydroxide passes into the solution as $Ni[NH_3]_6[OH]_2$.

The resultant ammonia solution containing only the nickel compound is worked up to nickel by known methods.

The cobalt remaining in the sediment is then dissolved by adding ammonia water with an addition of ammonium carbonate. Under there new conditions the cobalt passes into the solution as $Co[NH_3]_6CO_3$. Upon separating the solution from the insoluble residue one obtains therefrom cobalt in the desired form.

We claim:

1. A method for obtaining nickel and cobalt from metallurgical material free of sulfur and containing Co, Ni and at least one additional metal value comprising the steps of mixing said material with sulfuric acid to form a mixture of metal sulfates, roasting the mixture of metal sulfates at high temperature to decompose all of the metal sulfates except for the sulfates of Ni and Co, dissolving the Co and Ni sulfates in an aqueous solvent, adding a metal hypochlorite to precipitate Co at a pH of about 5.5, separating the precipitated Co, and precipitating Ni by adding a metal hypochlorite at a pH of about 6, said metal hypochlorites being selected from the group of alkali metal and alkaline earth metal hypochlorites.

2. A method for recovering Ni and Co from a metallurgical material free of sulfur and containing Ni, Co and at least one additional metal value comprising the steps of contacting said material with a gaseous reducing agent selected from the group of CO, $H_2$ and water gas to reduce Co and Ni to a metallic powder, then contacting the material so treated with CO at ambient pressure and at a temperature of from ambient up to 100° C. to volatilize Ni tetracarbonyl, then contacting the material so treated with CO at a pressure of from above atmospheric to about 10 atmospheres and at a temperature of from ambient up to 100° C. to form Co tetracarbonyl, and extracting the Co tetracarbonyl from the material.

3. A method of obtaining Ni and Co from metallurgical material free of sulfur and containing Ni, Co and at least one additional metal value comprising treating said material with ammonia water to pass Ni and Co into solution, adding NaCl to precipitate Ni and separating the precipitate.

4. A method of obtaining Ni and Co from metallurgical material free of sulfur and containing Ni, Co, and at least one additional metal value comprising washing the material free of sulfates, adding a metal hypochlorite to oxidize Co, adding ammonia water to dissolve the Ni as hydroxide, and treating the residue with ammonia water and ammonium carbonate to dissolve Co.

5. A method for recovering nickel and cobalt from low grade metallurgical materials containing less than 0.25% Ni and less than 0.25% Co comprising the steps of mixing particles of said low grade metallurgical material with a sulfur containing compound and a metal halide salt, roasting the mixed material at a temperature of from 250° C. to 600° C. in the presence of oxygen, mixing said material with sulfuric acid to form a mixture of metal sulfates, roasting the mixture of metal sulfates at high temperature to decompose all of the metal sulfates except for the sulfates of Ni and Co, dissolving the Co and Ni sulfates in an aqueous solvent, adding a metal hypochlorite to precipitate Co at a pH of about 5.5, separating the precipitated Co, and precipitating Ni by adding a metal hypochlorite at a pH of about 6, said metal hypochlorites being selected from the group of alkali metal and alkaline earth metal hypochlorites.

6. A method for recovering nickel and cobalt from low grade metallurgical materials containing less than 0.25% Ni and less than 0.25% Co comprising the steps of mixing particles of a low grade metallurgical material with a sulfur containing compound and a metal halide salt, roasting the mixed material at a temperature of from 250° C. to 600° C. in the presence of oxygen, contacting said material with a gaseous reducing agent selected from the group of CO, $H_2$ and water gas to reduce Co and Ni to a metallic powder, then contacting the material so treated with CO at ambient pressure and at a temperature of from ambient up to 100° C. volatilize Ni tetracarbonyl, then contacting the material so treated with CO at pressure of from above atmospheric to about 10 atmospheres and at a temperature of from ambient up to 100° C. to form Co tetracarbonyl, and extracting the Co tetracarbonyl from the material.

7. A method for recovering nickel and cobalt from low grade metallurgical materials containing less then 0.25% Ni and less than 0.25% Co comprising the steps of mixing particles of a low grade metallurgical material with a sulfur containing compound and a metal halide salt, roasting the mixed material at a temperature of from 250° C. to 600° C. in the presence of oxygen, treating said material with ammonia water to pass Ni and Co into solution, adding NaCl to precipitate Ni and separating the precipitate.

8. A method for recovering nickel and cobalt from low grade metallurgical materials containing less than 0.25% Ni and less than 0.25% Co comprising the steps of mixing particles of a low grade metallurgical material with a sulfur containing compound and a metal halide salt, roasting the mixed material at a temperature of from 250° C. to 600° C. in the presence of oxygen, washing the material free of sulfates, adding a metal hypochlorite to oxidize Co, adding ammonia water to dissolve the Ni as hydroxide, and treating the residue with ammonia water and ammonium carbonate to dissolve Co.

(References on following page)

References Cited by the Examiner
UNITED STATES PATENTS

| | | | |
|---|---|---|---|
| 1,487,145 | 3/1924 | Caron | 75—82 |
| 2,004,534 | 6/1935 | Muller et al. | |
| 2,205,565 | 6/1940 | Kissock | 75—119 |
| 2,232,527 | 2/1941 | Hill | 75—119 X |
| 2,694,006 | 11/1954 | Schaufelberger | 75—108 |
| 2,757,077 | 7/1956 | Lewis | 75—0.55 |
| 2,775,517 | 12/1956 | Mancke | 75—119 |
| 2,831,751 | 4/1958 | Birner | 75—119 X |
| 2,915,389 | 12/1959 | Dean | 75—119 X |
| 2,944,883 | 7/1960 | Queneau | 75—82 X |
| 3,082,068 | 3/1963 | Schlecht | 23—203 |

DAVID L. RECK, *Primary Examiner.*

BENJAMIN HENKIN, *Examiner.*